No. 775,892. PATENTED NOV. 22, 1904.
P. BRANDT.
GALVANIC ELEMENT OR BATTERY.
APPLICATION FILED APR. 20, 1904.
NO MODEL.
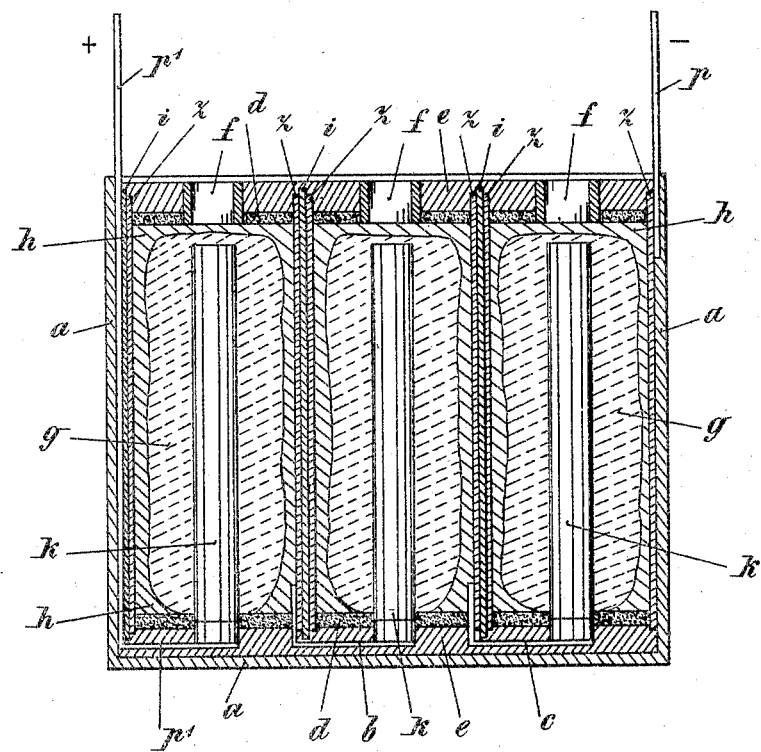

No. 775,892. Patented November 22, 1904.

UNITED STATES PATENT OFFICE.

PAUL BRANDT, OF SCHÖNEBERG, NEAR BERLIN, GERMANY.

GALVANIC ELEMENT OR BATTERY.

SPECIFICATION forming part of Letters Patent No. 775,892, dated November 22, 1904.

Application filed April 20, 1904. Serial No. 204,101. (No model.)

*To all whom it may concern:*

Be it known that I, PAUL BRANDT, merchant, a subject of the King of Prussia, German Emperor, residing at Schöneberg, near Berlin, in the Kingdom of Prussia, German Empire, have invented certain new and useful Improvements in Galvanic Elements or Batteries, of which the following is a specification.

The small galvanic elements or batteries as employed for pocket-lanterns and the like are possessed with the drawback that owing to the small dimensions of the element only a small filling-aperture can be provided apart from the fact that a second aperture must be provided for letting escape the air displaced by the liquid poured into the vessel or jar. Another point influencing the size of the filling-aperture is established by the current-conducting parts secured to the positive-pole and to the negative-pole electrode for connecting the element or the battery with the circuit. These current-conducting parts are covered with a comparatively thick layer of an isolating material—such as pitch, asphalt, and the like—poured also around and upon the elements. Owing to the isolating material being thus exposed at its upper surface, the material was very liable to crack off in the case of the element or battery being dropped, the current-conducting parts in question being then uncovered from the isolating layer or layers and being thus also subjected to outer influences of a hurtful nature.

Endeavors have already been made to obtain a large filling-opening by the use of cylinders consisting of zinc and being open at both ends, the lower opening of the cylinder or cylinders being employed as the filling-aperture. However, although obtaining by this means a large filling-aperture the current-conducting projecting parts of the element or battery were as badly protected as heretofore, and there was, moreover, the further drawback that filling up the elements was connected with pretty great difficulties, in so far as the elements had to be turned upside down. A battery constructed in this manner was useless during and also after the filling operation for a pretty great time, because the liquor or electrolyte had to be completely sucked off before the element could again be turned into its former proper position. All these drawbacks are overcome by the improved arrangement forming the subject-matter of this invention. In my improved element or battery the arrangement of the carbon electrode is the reverse of what it formerly was, since the connection between the carbon electrode of one element with the zinc electrode of the other element is effected at the bottom of the elements and the respective connecting parts are embedded in an isolating material—such as pitch, asphalt, and the like—the arrangement in this respect being such that the isolating material surrounding the said parts cannot crack off or leave its place in any way, as it is held securely in place at all sides. By arranging the current-conducting connecting parts at the lower end of a battery the upper ends of the elements of the same are free to receive large filling-apertures as well as a thick layer of the isolating material, as is more fully described hereinafter.

I have shown as an example one form of construction of my improved battery in the accompanying drawing, which shows a longitudinal section through a battery composed of three elements. In this battery the negative-pole electrodes are formed by cylinders $z$, separated one from the other by isolating partition-walls $i$. Each cylinder $z$ contains the positive-pole electrode $k\,g$, consisting of a part $k$ of carbon and a part $g$ of a substance adapted to suck up a comparatively large quantity of the electrolyte. The lower end of each cylinder $z$ is closed by a disk $d$ of isolating material, and the carbon $k$ extends downward through said disk. The projecting lower end of the carbon $k$ is connected with the lower end of the neighboring cylinder $z$ by a metallic strip $c$, embedded in a layer of isolating material $e$—such as pitch, asphalt, or the like—cast upon the bottom of the vessel $a$. From the last cylinder $z$ extends outward a metallic strip $p$, forming at its upper end the negative pole of the battery, and from the first carbon $k$ extends outward a metallic strip $p'$, the upper end of which forms the positive pole. The isolating material $e$ is securely held in place by the bottom $a$ and the neighboring portions of the side walls of the vessel as well as by the disks $d$, closing the lower ends of the cylinders $z$. Isolating-disks $d$ of the same kind as at the lower ends of the cylinders $z$ are provided also at the upper ends of the same, and each of the upper disks holds a piece of tube $f$, having a comparatively large inner diameter and forming the large filling-opening for the respective element. The pieces of tube $f$ consist generally of glass or a similar material. Upon the upper disks $d$ is also cast an isolating material of the kind already mentioned, the said material extending up to the upper end of the pieces of tube $f$, so that the upper surface of the battery shows besides the upper surface of the layer of the isolating material in question nothing else but the annular upper ends of the parts $f$ and the projecting ends of the metallic strips $p$ $p'$. Owing to the filling-apertures being so large, I can dispense with providing a special aperture for the escape of the air.

Having now described my invention, what I desire to secure by Letters Patent of the United States is—

1. In a galvanic element or battery, the combination with a positive-pole electrode, and a negative-pole electrode surrounding the former, of a connection between the two electrodes, located at the lower ends of the same, an isolating layer having said connection embedded in it, another layer of an isolating material situated upon the element, and a comparatively large filling-aperture in said upper layer, substantially and for the purpose as described.

2. In a galvanic electrode or battery, the combination with a carbon electrode $k$ and an envelop $g$ of a material adapted to suck up an electrolyte, and with a zinc electrode formed by a piece of tube zinc, of a connection between the lower end of a carbon electrode with the lower end of the neighboring zinc electrode, a layer of an isolating material having said connections embedded in it, another layer of the isolating material situated over the upper ends of the elements, disks also consisting of an isolating material, and located in the ends of the said cylinders between the electrolyte and the isolating layers, pieces of tube extending through the upper isolating layer and serving as filling-apertures for the elements, substantially and for the purpose as described.

In witness whereof I have hereunto set my hand in presence of two witnesses.

PAUL BRANDT.

Witnesses:
 WOLDEMAR HAUPT,
 HENRY HASPER.